(12) United States Patent
Maheshwari et al.

(10) Patent No.: US 11,961,079 B2
(45) Date of Patent: Apr. 16, 2024

(54) PROOF-OF-AGE VERIFICATION IN MOBILE PAYMENTS

(71) Applicant: MASTERCARD ASIA/PACIFIC PTE. LTD., Singapore (SG)

(72) Inventors: Rajat Maheshwari, Singapore (SG); Frederic Fortin, Brussels (BE); Prashant Sharma, Madison, NJ (US)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 0 days.

(21) Appl. No.: 17/363,468

(22) Filed: Jun. 30, 2021

(65) Prior Publication Data

US 2022/0005047 A1   Jan. 6, 2022

(30) Foreign Application Priority Data

Jul. 2, 2020   (SG) .......................... 10202006403Y (51) Int. Cl.
| | |
|---|---|
| *G06Q 20/40* | (2012.01) |
| *G06F 21/62* | (2013.01) |
| *G06Q 20/20* | (2012.01) |
| *G06Q 20/32* | (2012.01) |
| *G06Q 20/36* | (2012.01) |
| *G06Q 20/38* | (2012.01) |
| *G06Q 30/0601* | (2023.01) |

(52) U.S. Cl.
CPC ... *G06Q 20/40145* (2013.01); *G06F 21/6245* (2013.01); *G06Q 20/204* (2013.01); *G06Q 20/326* (2020.05); *G06Q 20/3278* (2013.01); *G06Q 20/363* (2013.01); *G06Q 20/3821* (2013.01); *G06Q 30/0607* (2013.01)

(58) Field of Classification Search
CPC .......... G06Q 20/40145; G06Q 20/204; G06Q 20/326; G06Q 20/3278; G06Q 20/363; G06Q 20/3821; G06Q 30/0607; G06F 21/6245

See application file for complete search history.

(56) References Cited

U.S. PATENT DOCUMENTS

| | | | | |
|---|---|---|---|---|
| 10,057,061 | B1* | 8/2018 | Maeng | H04L 63/18 |
| 11,334,931 | B2* | 5/2022 | Ryner | G06Q 20/405 |
| 11,443,301 | B1* | 9/2022 | Hayes | G06Q 20/326 |
| 2004/0153421 | A1* | 8/2004 | Robinson | G06Q 20/20 |
| | | | | 705/75 |
| 2008/0046366 | A1* | 2/2008 | Bemmel | G06Q 40/12 |
| | | | | 705/44 |
| 2008/0257956 | A1* | 10/2008 | Grannan | G06Q 30/06 |
| | | | | 235/380 |

(Continued)

OTHER PUBLICATIONS

Iqbal, Sarwat, et al. "A novel mobile wallet model for elderly using fingerprint as authentication factor." IEEE Access 8 (2020): 177405-177423. (Year: 2020).*

*Primary Examiner* — Asfand M Sheikh
(74) *Attorney, Agent, or Firm* — Barta Jones, PLLC (57) ABSTRACT

An age verification method performed at a mobile device comprises: receiving, from a point-of-sale terminal, a request for a payment credential, the request comprising a data element indicative of age requirement data; verifying, using at least one sensor, an identity of a user of the mobile device; responsive to said verifying, initiating, by a digital wallet application executing on the mobile device, an age verification request to a digital identity application, the age verification request comprising the age requirement data; generating a response message that comprises a response from the digital identity application to the age verification request; and transmitting, to the point-of-sale terminal, the response message and the payment credential for initiation of a transaction authorization request.

20 Claims, 3 Drawing Sheets

(56) References Cited

U.S. PATENT DOCUMENTS

| | | | |
|---|---|---|---|
| 2010/0252624 A1* | 10/2010 | Van de Velde | G06Q 20/409 235/382 |
| 2010/0274722 A1* | 10/2010 | Roberts | G07F 7/1008 705/44 |
| 2013/0041812 A1* | 2/2013 | Aubin | G06Q 20/4014 705/39 |
| 2015/0023572 A1* | 1/2015 | Williform | G06V 40/1312 382/124 |
| 2015/0120559 A1* | 4/2015 | Fisher | G06Q 20/3224 705/44 |
| 2016/0239887 A1* | 8/2016 | Zhao | G06Q 30/0607 |
| 2017/0255940 A1* | 9/2017 | Kohli | G06Q 20/20 |
| 2018/0025348 A1* | 1/2018 | Shauh | G06Q 20/3278 705/44 |
| 2018/0060928 A1* | 3/2018 | Sadler | G06Q 20/20 |
| 2018/0181954 A1* | 6/2018 | Sinton | G06Q 20/202 |
| 2018/0181964 A1* | 6/2018 | Zagarese | G06Q 20/40145 |
| 2019/0258838 A1* | 8/2019 | Sweeney | G06Q 30/04 |
| 2020/0092285 A1* | 3/2020 | Graham | G06Q 20/3821 |
| 2020/0400441 A1* | 12/2020 | Efland | G01C 21/3822 |
| 2021/0279994 A1* | 9/2021 | Patel | G07F 9/009 |
| 2021/0357600 A1* | 11/2021 | Sweeney | G06K 7/1404 |
| 2021/0390556 A1* | 12/2021 | Bermudez | G06Q 20/405 |
| 2022/0253846 A1* | 8/2022 | Tobb | G06V 30/418 |
| 2023/0322487 A1* | 10/2023 | Patel | G06K 7/1413 700/206 |

\* cited by examiner

PROOF-OF-AGE VERIFICATION IN MOBILE PAYMENTS

CROSS REFERENCE TO RELATED APPLICATION(S)

This application claims priority to Singapore Patent Application No. 10202006403Y, filed Jul. 2, 2020, entitled "Proof-of-Age Verification in Mobile Payments", the entirety of which is incorporated herein by reference.

TECHNICAL FIELD

The present disclosure relates to proof-of-age verification in mobile payments conducted at point-of-sale terminals.

BACKGROUND

It is usual for access to certain products, such as alcohol and tobacco, to be restricted according to age. This places the onus on merchants who sell such products to ensure that customers meet the age requirement. Age verification checks are typically done manually by the merchant.

In most cases, the consumer will present a government issued identity document such as a driver's license, national identity card, or passport, to verify their age at the point of sale. The merchant typically does not have any capability to confirm the authenticity of the identity document, particularly in the case of driver's licenses, fraudulent instances of which can readily be obtained via channels such as the dark web.

To address the problem of identity theft, online verification systems have been developed. However, these are expensive and generally inaccessible to most merchants.

It would be desirable to address one or more of the above difficulties, or at least to provide a useful alternative.

SUMMARY

The present disclosure relates to an age verification method performed at a mobile device. A request for a payment credential is received from a point-of-sale terminal. The request includes a data element indicative of age requirement data. An identity of a user of the mobile device is verified using at least one sensor. Responsive to said verifying, an age verification request to a digital identity application is initiated by a digital wallet application executing on the mobile device. The age verification request includes the age requirement data. A response message is generated. The response message includes a response from the digital identity application to the age verification request. The response message and the payment credential for initiation of a transaction authorization request is transmitted to the point-of-sale terminal.

The age requirement data, in some examples, includes a minimum age for purchase of a product. The age requirement data may include a maximum age of updating of age credentials stored by the digital identity application. In some examples, the response from the digital identity application includes an indication as to whether the age requirement is met. In other examples, the response from the digital identity application comprises a date of birth of the user. The request for the payment credential may be an EMV GENERATE AC command, for example.

In some examples, the mobile device transmits, to the point-of-sale terminal, a Card Risk Management Data Object List (CDOL). In these examples, one of the objects in the CDOL specifies a format for the age requirement data.

The present disclosure also relates to a mobile device configured to perform an age verification process. A near field communication (NFC) interface receives, from a point-of-sale terminal, a request for a payment credential. The request includes a data element indicative of age requirement data. At least one sensor captures biometric data from a user. A biometric authentication module verifies an identity of the user using the biometric data. A digital wallet application initiates an age verification request to a digital identity application in response to the verification. The age verification request includes the age requirement data. A response message is generated that includes a response from the digital identity application to the age verification request. The response message and the payment credential for initiation of a transaction authorization request are transmitted to the point-of-sale terminal.

The present disclosure further relates to a mobile device comprising at least one processor in communication with computer-readable storage, the computer-readable storage having instructions stored thereon for causing the at least one processor to perform a method as disclosed herein.

The present disclosure further relates to a computer-readable storage medium having stored thereon machine-readable instructions for causing at least one processor to perform a method as disclosed herein.

BRIEF DESCRIPTION OF THE DRAWINGS

Embodiments of the present invention will now be described, by way of non-limiting example, with reference to the drawings in which.

DETAILED DESCRIPTION

Embodiments of the present invention generally relate to methods and systems for automated age verification during transactions carried out at point-of-sale terminals.

Figure 1:
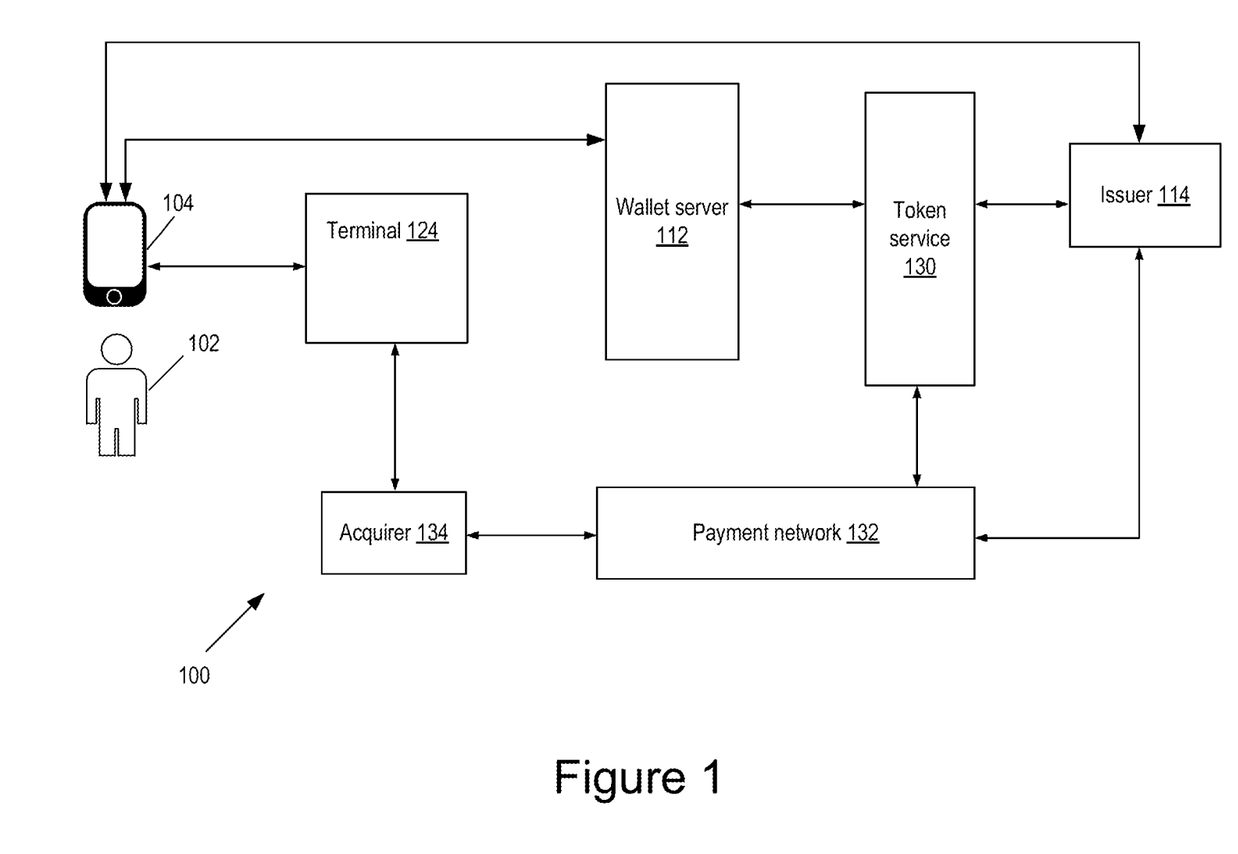
FIG. 1 is an architecture diagram of an example system for proof-of-age verification.

FIG. 1 is a block diagram illustrating a system 100 in which teachings of the present disclosure may be applied. An individual user and/or cardholder or consumer is indicated by reference numeral 102 in FIG. 1. Many of the users 102 habitually carry with them mobile devices 104, such as smartphones, tablet computers, or the like, which are configured for entering mobile payment transactions. The consumer's mobile device 104 (such as an iPhone™ or Android™ device) typically includes components such as a microphone, speaker, touchscreen, digital camera and/or a biometric sensor (such as a fingerprint scanner, not shown). The mobile device 104 includes a mobile/digital wallet application 330 (FIG. 3) which may include a software development kit (SDK) 331. The SDK 331 is used to facilitate communications between the digital wallet and the wallet service provider 112 and/or issuer FI 114 and/or token service provider 130, as well as for performing payment card, transaction, fraud and digital wallet management functions, and the like.

In some implementations, the consumer's mobile device 104 includes software instructions (such as implemented in the digital wallet application 330) configured to obtain digital identity information for use in age verification during purchase transactions. For example, the mobile digital wallet application 330 may be configured to receive from a merchant terminal 124, a request for age verification, and to initiate a request for age verification to another application such as a digital identity application 332 (also referred to herein as an electronic identity (E-ID) application) executing on the mobile device 104, or to an external digital identity service (not shown) that implements a digital identity application. The received digital identity information may then be incorporated into transaction data that is sent to the merchant terminal 124. The merchant terminal 124 then forms a transaction request that is sent to an acquirer system 134 for forwarding to a payment network 132 for further transaction processing with relation to payment for goods and/or services, which will be further explained below.

The mobile device 104 is configured for communications with a wallet server/computer 112 (which may be owned and/or operated by an issuer FI, or an entity such as a Wallet Service Provider (WSP), or a payment processing entity such as Mastercard International Incorporated). In some implementations, the communications between the user's mobile device 104 and the wallet server 112 may occur through use of a private network or a public network and/or combinations thereof, for example, by using the Internet (not shown in FIG. 1). As shown, the wallet server 112 is in turn configured for communications with an issuer system 114 (which may be associated with, for example, a bank which issues payment card accounts to consumers or users). The wallet server 112 may transmit mobile device provisioning requests for tokenization and/or digitization, user and/or mobile device authentication requests, wallet and/or card management requests, and/or notification data to the issuer system 114 and may receive responses to such requests and/or data. In addition, the issuer system 114 may provide additional data and or information such as wallet life cycle data, card management data, and/or user data updates to the wallet server 112. The issuer system 114 may also be configured for providing card management services, authentication and/or access to a customer service representative for customer support regarding the wallet. It should be understood that, in practical digital identity systems 100 a plurality of issuer systems 114 may be included.

The age verification system architecture 100 includes a token service system 130, which functions as a trusted service provider (TSP) and may include a token vault (not shown). The token service system 130 is operable to provide a plurality of on-behalf-of (OBO) services, including digitization and tokenization services to requestors, which replaces payment card account numbers with tokens and places these into digital web wallet or mobile wallet environments. In accordance with a Payment Token Interoperability Standard, token requestors may include payment card account issuers (which include issuer financial institutions, such as banks), card-on-file merchants, acquirer financial institutions, original equipment manufacturer (OEM) device manufacturers and digital wallet providers. In some embodiments, each such token requestor is required to register with the token service system 130 before requesting use of the token service, which includes mapping tokens to card numbers during a purchase transaction in a secure manner (typically by using cryptograms). Thus, the token service system 130 enables connected devices to make purchases in-store, in-app and/or online (via the Internet). In addition, as a provider of tokens, the token service system 130 may perform such functions as operating and maintaining the token vault (which stores token data, including token requester credentials and/or payment account data associated with the tokens), generating, and issuing or provisioning tokens, assuring security and proper controls, and registering token requestors.

In addition, in some embodiments, during the tokenization process the token service system 130 may be configured to generate and provide an EMV-like version of the user's payment card account number. ("EMV" stands for Europay, Mastercard, Visa, and denotes a global standard for chip-based debit card account and credit card account transactions that ensures security and global acceptance of such accounts.) For example, in a contactless transaction conducted at terminal 124, the terminal 124 may transmit merchant information (e.g., merchant name, merchant ID, transaction ID, nonce), as well as transaction information (for example, the transaction amount, currency and a transaction timestamp), and a cryptogram generated either by the device or by the cloud (retrieved from the wallet server) would be utilized in the purchase transaction. The token service system 130 would perform cryptogram validation and de-tokenization before the purchase transaction is authorized by the issuer 114. Once the issuer 114 authorizes the transaction, a response is transmitted back to the payment network 132, which then sends the response to token service system 130 for token mapping. The token service system 130 completes token mapping and sends the authorization response and/or financial transaction in tokenized form to the payment network 132. The payment network 132 then forwards the response back to the acquirer system 134, which then sends it to the POS terminal 124 to complete the transaction.

The token service system 130 is operably connected to the wallet server 112, the issuer system 114, and to a payment network 132. The payment network 132, which may be the well-known Banknet® system operated by Mastercard International Incorporated, is operably connected to the acquirer system 134 and to the issuer system 114. The acquirer system 134 is associated with the financial institution (the merchant FI) that provides banking services to the merchant, and functions to receive and to route payment transaction authorization requests that originate from the merchant terminal 124.

As mentioned earlier, in a practical age verification system, there will be a plurality of issuer FI computers that typically represent banks or other financial institutions that provide banking services to users or consumers in addition to issuing payment accounts (for example, credit card accounts and/or debit card accounts) to the cardholders or users 102. Such a practical system will also include a plurality of consumers and their associated mobile devices, as well as a plurality of merchants and their associated merchant mobile devices, POS terminals, merchant servers, and merchant acquirer FIs.

As mentioned above, the token service system 130 provides tokenization and/or digitization services and/or token updates to the wallet server 112, may also provide identification and verification services, customer services and notifications to the issuer system 114, and may also provide tokenization, transaction history and notification services to the payment network 132.

Communication between the mobile device 104 and the terminal 124 may take place substantially in accordance with the EMV Contactless Specification. However, unlike a standard EMV contactless transaction, one or more additional data objects may be exchanged between the mobile device 104 and the terminal 124.

For example, in some embodiments, the CDOL (card data object list), that indicates a list of data to be delivered in the context of an EMV transaction, may include age verification data comprising an age verification data object. The terminal 124 may initiate an EMV transaction, and (among other standard contactless EMV transaction steps) send a GENERATE AC command to the mobile device 104. Mobile device 104 (for example, via digital wallet application 330) then generates, as part of card action analysis, a CDOL that comprises the age verification data object as well as a plurality of other data objects that are requested from a terminal in a standard EMV transaction, such as transaction-specific information including transaction amount, a transaction identifier, and a timestamp. The presence of the age verification data object prompts the digital wallet application 330 to initiate the age verification request as discussed above.

Figure 2:
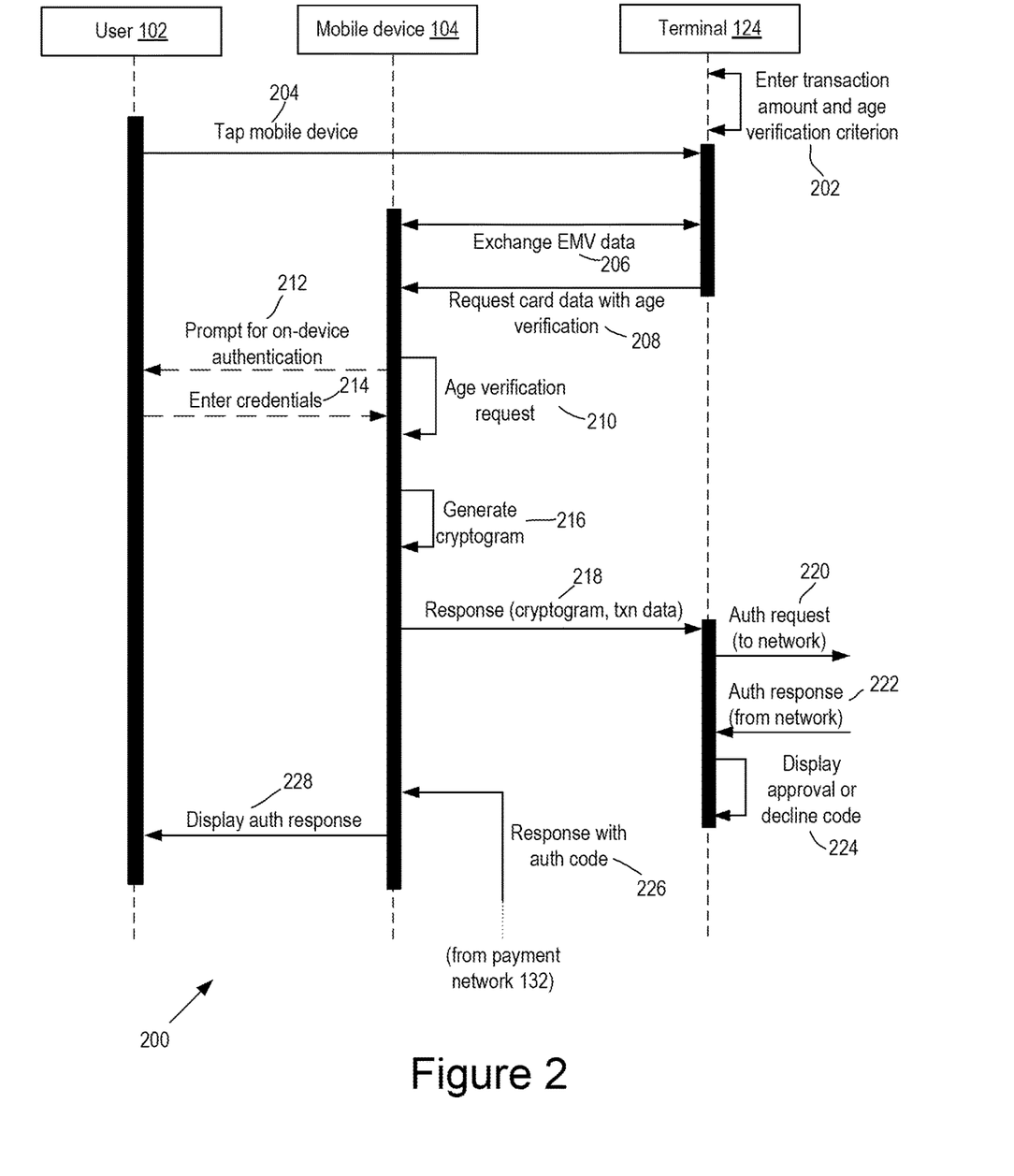
FIG. 2 is a swim lane diagram of an example process for proof-of-age verification.

An example method 200 of age verification performed between a mobile device 104 and a terminal 124 will now be described with reference to FIG. 2.

In a first step 202 of the method 200, a transaction amount is entered at the terminal 124. This may be done directly using a keypad of the terminal 124, or via a point of sale (POS) system (not shown) with which the terminal is operatively coupled. For example, a number of items for purchase may be entered at the POS system (e.g., by way of a barcode scanner, or manually by the merchant) and a total amount transmitted to the terminal 124 as the transaction amount.

Also, as part of step 202, at least one age verification criterion is entered at the terminal 124. Again, this can be performed manually at terminal 124. For example, the terminal 124 may be configured to prompt the merchant to enter, using a keypad thereof, the age verification criterion. In some embodiments, this may simply be a yes/no indication as to whether age verification is required (for example, because the user or cardholder is seeking to purchase alcohol or tobacco products). In other embodiments, the age verification criterion may be a minimum age to be enabled to purchase the product (for example, 18 years old). In further embodiments, both a minimum age of the cardholder, and a time limit within which the cardholder's age was last authenticated by the cardholder's issuer, may be entered as age verification criteria. For example, the merchant may enter "18" for the minimum age and "3" (indicating months) for the time limit when prompted by terminal 124. Alternatively, any or all of these criteria may be transmitted to the terminal 124 by the POS system, as for the transaction amount. For example, the POS system may automatically detect, based on the items scanned or otherwise entered into the system for purchase, whether any of those items has an age restriction associated with it, and automatically send age verification criteria to the terminal 124 with the transaction amount.

In some embodiments, the merchant (manually, or via the POS system) may specify a transaction amount of zero. In these embodiments, no payment transaction occurs; rather, the payments system infrastructure (acquirer 134, payment network 132, and issuer 114, together with any other devices with which they communicate during ordinary processing of payment transactions) is used for age verification alone. In this way, the merchant can verify the cardholder's age before any age-restricted items are scanned, for example.

After step 202, the terminal 124 is in polling mode, i.e., in a state of readiness to receive card data, for example via NFC communication with a payment-enabled contactless device such as mobile device 104. To this end, at step 204, the cardholder or user 102 readies mobile device 104 for a contactless transaction by activating digital wallet application 330. Typically, digital wallet application 330 may be configured to require on-device cardholder verification, e.g., the entry of a mobile PIN (mPIN) or biometric data (e.g., a fingerprint, retinal scan, or facial scan), to unlock payment credentials stored in connection with digital wallet application 330 for use. Once the digital wallet application 330 is active and cardholder verification is completed, the cardholder or user 102 brings mobile device 104 into the vicinity of terminal 124 (referred to herein as a "tap" interaction).

At step 206, mobile device 104 and terminal 124 exchange a number of application protocol units (APDUs), in accordance with the EMV Contactless Specification and with ISO/IEC 7816-4. The majority of these APDUs are conventional in nature. However, once standard operations such as application selection and requesting of get processing options have been performed, the terminal 124 sends, at step 208, a request to mobile device 104 for card data, with age verification data comprising the age verification criterion or criteria included in the request. For example, the request may be a GENERATE AC command APDU based on a CDOL that includes the age verification data object encoding the age verification criterion/criteria.

At step 210, mobile device 104 receives the request including the age verification data, and this is processed by digital wallet application 330. Digital wallet application 330, on detection of the age verification data in the request data, initiates an age verification request to digital identity application 332. In some examples, the CDOL may include optional/proprietary fields which can include the data in a byte to indicate age verification. For example, the byte structure may be of the form 00 00 0000 where the first two bits indicate whether only age verification is requested, or actual date of birth is requested; the next two bits indicate the assurance level required for age (for example, how many Identity Verification Providers, such as identity document issuers, have validated the user's age on the digital identity application); and the last four bits indicate the freshness of data (i.e., how long ago the last age verification was performed by the digital identity application).

Optionally, at step 212, digital identity application 332 may require the user 102 to perform an additional verification step (e.g., by entry of an mPIN or biometric data) to grant access to the user 102's identification data stored on the mobile device 104.

Once verification is successfully performed by user 102 at step 214, or if additional user verification is not performed, digital identity application 332 continues to process the age verification request from the digital wallet application 330 by retrieving identification data for user 102. Retrieval of the identification data may be implemented in many different ways, depending on the specific digital identity application 332. For example, the identification data may be stored on a secure element (SE) 322 (FIG. 3) of the mobile device 104, or in a secure area of a memory 304 of mobile device 104 that is only accessible by the digital identity application 332. In other examples, the identification data may be securely stored on a remote server with which digital identity application 332 communicates. The identification data may include a current age or a date of birth of user 102, for example.

As part of step 210, digital identity application 332 may simply return to digital wallet application 330, an indication that the identification data satisfy each of the age verification criteria in the age verification request. For example, if the retrieved value of the current age of the user 102 is equal to or greater than an age threshold in the request, a binary flag may be set to a value of 1 in the response sent to the digital wallet application 330. In another example, if a retrieved value of a "freshness" indicator, such as a timestamp of the last update to the identification data on the mobile device 104, is less than a threshold specified in one of the age verification criteria (e.g., last update within 3 months of the age verification request), a binary flag for that criterion may be set to a value of 1 in the response sent to the digital wallet application 330. In this way, the digital identity application 332 can provide the requested age verification without sending any personally identifiable information (PII) to the digital wallet application 330, such that no PII is transmitted to terminal 124 and thus not shared with the merchant.

In some embodiments, as part of step 210, digital identity application 332 may return the retrieved identification data to the digital wallet application 330, for inclusion in a transaction authorization request message that will be processed by issuer system 114 (or by an issuer processor acting on behalf of issuer system 114). Issuer system 114 may then compare the identification data in the transaction authorization request message to the corresponding identification data in its records and use the result of the comparison as part of its authorization decision, as will be discussed further below.

At step 216, digital wallet application 330 generates an application cryptogram in accordance with standard EMV protocols. This may be done on the device itself, or may, for example, be done at wallet server 112 on request by the digital wallet application 330.

At step 218, mobile device 104, via digital wallet application 330, transmits a response message to terminal 124 that includes the cryptogram and transaction data. The transaction data may include transaction amount, transaction time, a device PAN (DPAN) of a payment card digitized in the digital wallet application 330 (i.e., a tokenized version of the real PAN of the payment card), and age verification results (such as values of binary flags as mentioned above) or identification data received from digital identity application 332.

At step 220, terminal 124 sends the response message to the payment network 132 for processing. This is done via acquirer system 134 which generates a tokenized purchase transaction authentication request and transmits it to the payment network 132. The request is tokenized in that payment card data, such as the PAN, is not transmitted as part of the request; only proxy values, such as then DPAN in place of the real PAN, are transmitted. The transaction authentication request may be formatted as an ISO 8583 or ISO 20022 transaction message, for example. In some embodiments, the age verification results and/or identification data may be encoded in a reserved data element of the ISO message, for example DE 48 or DE 55 of an ISO 8583 message. For example, a positive indication that the user 102 meets the age requirement specified by terminal 124 (a binary '1' or other value indicating success) may be encoded in the reserved data element, without transmitting any personal information of the user 102.

Next the payment network 132 transmits the tokenized purchase transaction authentication request to the token service system 130, which validates the application cryptogram for the purchase transaction. In some implementations, the token service system 130 next transmits a push notification directly to a Remote Notification Service (RNS)/ Transaction Detail Service (TDS). The RNS/TDS then transmits the push notification to the consumer's mobile device 104 (which has an active mobile wallet application and has Internet and/or wireless connectivity), which includes a request for consent from the consumer to the purchase transaction. The confirmation message is received by the consumer's mobile device 104 and displayed on a display component for the user to consider, which consent must be provided within a certain amount of time or else the transaction authorization process will terminate. It should be understood that, in embodiments where the Wallet Service Provider of, for example, an X-Pay wallet is transmitting the push notification, the consumer's mobile device would require wireless connectivity (for example, Internet and/or Bluetooth connectivity, or the like).

The transaction confirmation message may include details of the transaction, such as the time of purchase, the merchant's name, location data, name/display of item(s) being purchased, the transaction amount and currency, the payment method used, and a card image. At this point in the process, the consumer may also be prompted to also enter a CVM on the mobile device (DLA) or mobile wallet application (mobile/wallet PIN, biometrics, etc.), which may occur for example, when velocity checks were not passed, and/or when a CVM was not entered by the consumer via the mobile wallet application prior to performing a tap at step 204, and/or when the transaction is a high value transaction, and/or when the number of transactions without CVM entry exceeded a certain limit. In some implementations, the transaction confirmation message may also provide the consumer with the option to cancel the transaction (for example, a "Cancel" radio button may be provided which the consumer may select to end the process, or a "Back" button may be provided for the consumer to re-start or end the process). In some implementations, the push notification may be transmitted by the token service system 130 via the payment network 132 to an RNS, and then to the consumer's mobile device 104.

When the user confirms the transaction (for example, by pressing a "Confirm" radio button appearing on the display screen, and/or by entering CVM), then a confirmation message is transmitted to the token service system 130 along with the CVM data, and the token service system 130 validates the application cryptogram that may contain CVM data, and performs token mapping. Next the token service system 130 transmits the de-tokenized, verified purchase authentication request to the payment network 132, which then transmits the de-tokenized, verified purchase transaction authorization request to the issuer system 114 for purchase transaction authorization processing (financial approval).

Thus, the issuer system 114 processes the purchase transaction authorization request and applies authorization logic to determine whether or not to authorise the transaction. The authorization logic may include standard checks such as whether the consumer's payment account is in good standing and has an adequate credit line and may also take into account risk-related factors such as transaction velocity, transaction size, and the like. Importantly, in at least some of the presently disclosed embodiments, the authorization logic also includes an age verification check. The age verification check may comprise determining if the transaction authorization request originates from a digital wallet application, if so, whether a digital identity application 332 executing on the same mobile device has already conducted age verification, and what the results of that age verification were. Alternatively, the age verification check may comprise determining whether a field of the transaction authorization message, such as DE 48 or DE 55, contains a date of birth or age that can be checked against that which is on record at issuer system 114 for the consumer's payment account.

If the authorization logic indicates that all checks are passed and that the transaction authorization request should be approved, the issuer system 114 transmits a de-tokenized authorization response message, indicating approval, to the payment network 132. The payment network 132 receives it, and then transmits the de-tokenized authorization response message to the token service system 130, which performs token mapping, and then transmits the tokenized authorization response to the payment network 132. The payment network then transmits the tokenized authorization response to the acquirer system 134, which in turn transmits the tokenized authorization response to the merchant terminal 124 at step 222 of FIG. 2. When the merchant terminal 124 receives the tokenized authorization response, in some embodiments an authorization message is displayed at step 224 for the benefit of a store clerk or cashier (and the consumer) and the process ends.

In some embodiments the payment network 132 also transmits the transaction result to an RNS/TDS. The RNS/TDS then generates and transmits (step 226) a transaction result message to the consumer's mobile device 104, where it is displayed (step 228) for the consumer. Thus, in some embodiments the consumer receives an acknowledgement/confirmation message via the digital wallet application 330, which may be transmitted from an issuer RNS, wallet service provider RNS, third party RNS, or TDS (which is an RNS managed by the token service system 130) after the transaction has been authorized (or declined), and assuming that internet and/or wireless connectivity exists.

If the authorization logic applied by issuer system 114 indicates that the transaction authorization request should not be approved, the issuer system 114 transmits a de-tokenized authorization response message, indicating that the request has been declined, together with a decline code, to the payment network 132. As before, the payment network 132 transmits the de-tokenized authorization response message to the token service system 130, which performs token mapping, and then transmits the tokenized authorization response to the payment network 132. The payment network then transmits the tokenized authorization response to the acquirer system 134, which in turn transmits the tokenized authorization response to the merchant terminal 124 at step 222 of FIG. 2. When the merchant terminal 124 receives the tokenized authorization response, the decline code is displayed on terminal 124 (at step 224). For example, if the decline code indicates that the age verification checks were unsuccessful, the terminal 124 may indicate this. In some embodiments, as before, the payment network 132 may also transmit to an RNS/TDS, a decline message, and a decline code to the mobile device 104.

Figure 3:
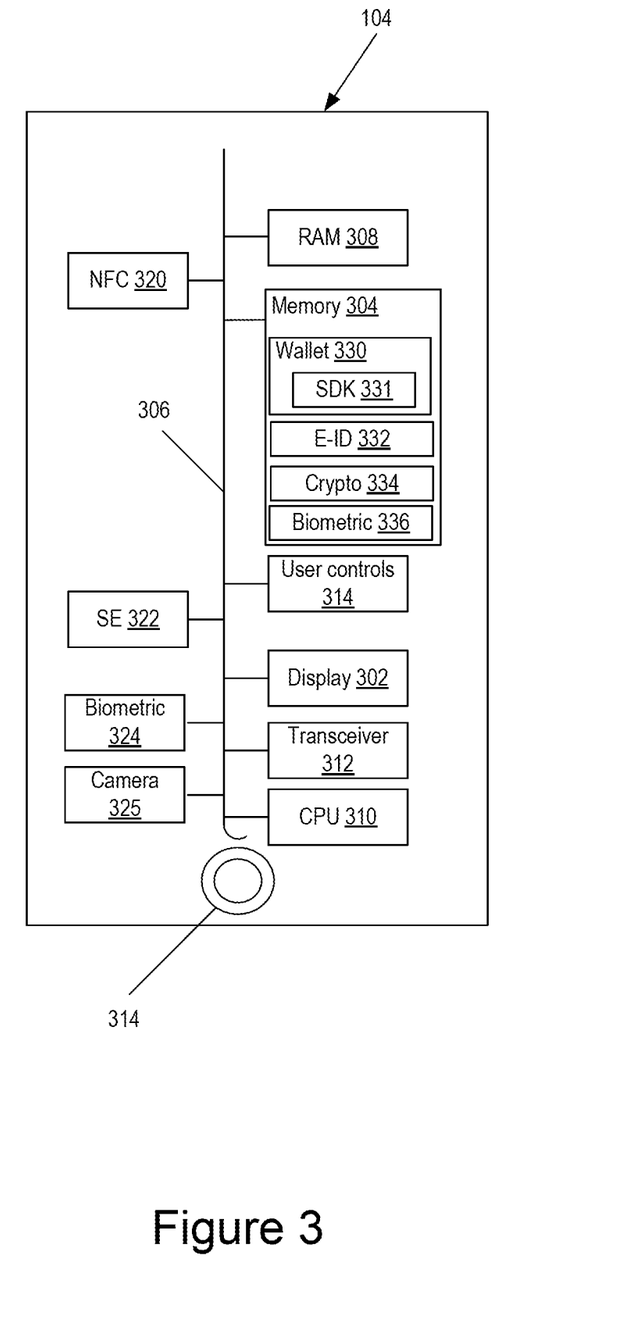
FIG. 3 is an architecture diagram of an example mobile device configured to perform steps of a proof-of-age verification process.

FIG. 3 is a block diagram showing an exemplary architecture of a mobile device 104 suitable for carrying out embodiments of the present disclosure. The mobile device 104 may be a mobile computer device such as a smart phone, a tablet, a personal data assistant (PDA), a palm-top computer, and multimedia Internet enabled cellular telephones.

As shown, the mobile device 104 includes the following components in electronic communication via a bus 306: a display 302; non-volatile (non-transitory) memory 304; random access memory ("RAM") 308; N processing components 310; a transceiver component 312 that includes N transceivers; user controls 314; an NFC controller 320; a secure element 322; one or more biometric sensors 324; and at least one camera 325.

Although the components depicted in FIG. 3 represent physical components, FIG. 3 is not intended to be a hardware diagram. Thus, many of the components depicted in FIG. 3 may be realized by common constructs or distributed among additional physical components. Moreover, it is certainly contemplated that other existing and yet-to-be developed physical components and architectures may be utilized to implement the functional components described with reference to FIG. 3.

The display 302 generally operates to provide a presentation of content to a user and may be realized by any of a variety of displays (e.g., CRT, LCD, HDMI, micro-projector, and OLED displays).

In general, the non-volatile data storage 304 (also referred to as non-volatile memory) functions to store (e.g., persistently store) data and executable code.

In some embodiments for example, the non-volatile memory 304 includes bootloader code, modem software, operating system code, file system code, and code to facilitate the implementation components, known to those of ordinary skill in the art, which are not depicted nor described for simplicity. For example, the non-volatile memory 304 may contain a digital wallet application 330 (which itself comprises an SDK 331 as mentioned above), a digital identity (or E-ID) application 332, a cryptographic module 334, and a biometric authentication module 336.

The cryptographic module 334 may be used by digital wallet application 330 during payment and non-payment transactions, for example conducted at terminals 124. To this end, cryptographic module 334 may comprise executable code implementing various cryptographic algorithms for key generation, encryption, and decryption of data, for example for generating nonce values and cryptograms for transaction authorization requests as described above.

In some embodiments, cryptographic module 334 may be stored in, and execute on, the SE 322, and/or may enable digital wallet application 330 and/or digital identity application 332 to access secure data stored on SE 322.

The biometric authentication module 336 is configured to receive biometric data captured from user 102 by one or more sensors of the mobile device 104, generate a biometric template from the biometric data, and compare the biometric data to a stored biometric template to authenticate the user 102. To this end, a "sensor" may be one or more of the biometric sensors 324, such as a fingerprint sensor, or may be camera 325, or another component such as a microphone (not shown). A "sensor" may also include an input device of the mobile device 104, such as display 302 (where the display 302 is a touch-screen display).

The biometric data may comprise fingerprint data, facial scan or iris scan data, voiceprint data, and/or behavioural data inferred from the interaction of user 102 with mobile device 104 (e.g., the manner in which user 102 enters keystrokes or other inputs on a virtual keyboard display on display 302). Capture of the biometric data may be initiated by the biometric authentication module 336 itself. For example, another application executing on mobile device 104, such as a mobile banking application, may invoke the biometric authentication module 336, which then prompts the user 102 to scan their finger or face, or to speak a passphrase, such that the biometric authentication module 336 can generate the biometric template.

In many implementations, the non-volatile memory 304 is realized by flash memory (e.g., NAND or ONENAND memory), but it is certainly contemplated that other memory types may be utilized as well. Although it may be possible to execute the code from the non-volatile memory 304, the executable code in the non-volatile memory 304 is typically loaded into RAM 308 and executed by one or more of the N processing components 310.

The N processing components 310 in connection with RAM 308 generally operate to execute the instructions stored in non-volatile memory 304. As one of ordinarily skill in the art will appreciate, the N processing components 310 may include a video processor, modem processor, DSP, graphics processing unit (GPU), and other processing components.

The transceiver component 312 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS network), and other types of communication networks.

The mobile device 104 can execute mobile applications, such as digital wallet application 330. The digital wallet application 330 may be accessed by a computing device such as mobile device 104, or a wearable device such as a smartwatch.

It should be recognized that FIG. 3 is merely exemplary and in one or more exemplary embodiments, the functions described herein may be implemented in hardware, software, firmware, or any combination thereof. If implemented in software, the functions may be transmitted or stored as one or more instructions or code encoded on a non-transitory computer-readable medium 804. Non-transitory computer-readable medium 804 includes both computer storage medium and communication medium including any medium that facilitates transfer of a computer program from one place to another. A storage medium may be any available medium that can be accessed by a computer.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

What is claimed is:

1. An age verification method performed at a mobile device, comprising:
   receiving, from a point-of-sale terminal, a request for a payment credential, the request comprising a data element indicative of age requirement data;
   verifying, using at least one sensor, an identity of a user of the mobile device;
   responsive to said verifying on the mobile device, initiating, by a digital wallet application executing on the mobile device, an age verification request to a digital identity application executing on the mobile device, the age verification request comprising the age requirement data;
   receiving, from the digital identity application executing on the mobile device, a response to the age verification request, the response including a count of identity document issuers that have validated an age of the user on the digital identity application;
   retrieving a value of a freshness indicator indicating how long ago the age of the user was last verified by the digital identity application;
   determining that the value of the freshness indicator is less than a threshold;
   based upon the determination, generating a response message including a binary flag for the freshness indicator indicating how long ago the age of the user was last verified, the response message comprising the response from the digital identity application to the age verification request; and
   transmitting, to the point-of-sale terminal, the response message, and the payment credential for initiation of a transaction authorization request.

2. The method of claim 1, wherein the age requirement data comprises a minimum age for purchase of a product.

3. The method of claim 1, wherein the age requirement data comprises a maximum age of updating of age credentials stored by the digital identity application.

4. The method of claim 1, further comprising:
   processing, by the digital identity application, the age verification request by retrieving identification data for the user stored on the mobile device; and
   returning, by the digital identity application, an indication to the digital wallet application that the identification data satisfies an age verification criterion in the age verification request.

5. The method of claim 1, wherein the response from the digital identity application comprises a date of birth of the user, and further comprising:
   providing, by the digital identity application, requested age verification without sending any personally identifiable information (PII) to the digital wallet application, such that no PII is transmitted to the point-of-sale terminal.

6. The method of claim 1, further comprising:
   using biometric data captured from the user to verify the identity of the user.

7. The method of claim 1, wherein the request for the payment credential is an EMV GENERATE AC command.

8. The method of claim 7, further comprising:
   transmitting, by the mobile device, to the point-of-sale terminal, a Card Risk Management Data Object List (CDOL), and wherein one or more objects in the CDOL specifies a format for the age requirement data, the format for the age requirement data including bits for the count of the identity document issuers that have validated the age of the user.

9. A mobile device configured to perform an age verification process, comprising:
   a near field communication (NFC) interface configured to receive, from a point-of-sale (POS) terminal, a request for a payment credential, the request comprising a data element indicative of age requirement data;
   at least one sensor configured to capture biometric data from a user, upon receiving the request via the NFC interface;
   a biometric authentication configured to verify, using said biometric data, an identity of the user; and
   a digital wallet application executing on the mobile device, wherein the digital wallet application is configured to:

responsive to said verifying on the mobile device using said biometric data, initiate an age verification request to a digital identity application executing on the mobile device, the age verification request comprising the age requirement data;

receive, from the digital identity application executing on the mobile device, a response to the age verification request, the response including a count of identity document issuers that have validated an age of the user on the digital identity application;

retrieve a value of a freshness indicator indicating how long ago the age of the user was last verified by the digital identity application;

determine that the value of the freshness indicator is less than a threshold;

based upon the determination, generate a response message including a binary flag for the freshness indicator, the response message comprising the response from the digital identity application to the age verification request; and transmit, to the POS terminal, the response message, and the payment credential for initiation of a transaction authorization request.

10. The mobile device of claim 9, wherein the age requirement data comprises a minimum age for purchase of a product.

11. The mobile device of claim 9, wherein the age requirement data comprises a maximum age of updating of age credentials stored by the digital identity application.

12. The mobile device of claim 9, wherein the response from the digital identity application comprises an indication as to whether an age requirement is met.

13. The mobile device of claim 9, wherein the response from the digital identity application comprises a date of birth of the user.

14. The mobile device of claim 9, wherein the request for the payment credential is an EMV GENERATE AC command.

15. The mobile device of claim 14, wherein the digital wallet application is configured to transmit, to the POS terminal, a Card Risk Management Data Object List (CDOL), and wherein one or more objects in the CDOL specifies a format for the age requirement data.

16. A computer-readable storage device having stored thereon machine-readable instructions which, on execution by a computer, cause the computer to perform operations comprising:

receiving, from a point-of-sale terminal, a request for a payment credential, the request comprising a data element indicative of age requirement data;

verifying, using at least one sensor, an identity of a user of a mobile device;

responsive to said verifying on the mobile device, initiating, by a digital wallet application executing on the mobile device, an age verification request to a digital identity application, the age verification request comprising the age requirement data;

receiving, from the digital identity application executing on the mobile device, a response to the age verification request, the response including a count of identity document issuers that have validated an age of the user on the digital identity application;

retrieving a value of a freshness indicator indicating how long ago the age of the user was last verified by the digital identity application;

determining that the value of the freshness indicator is less than a threshold;

based upon the determination, generating a response message including a binary flag for the freshness indicator, the response message comprising the response from the digital identity application to the age verification request; and transmitting, to the point-of-sale terminal, the response message, and the payment credential for initiation of a transaction authorization request.

17. The computer-readable storage device of claim 16, wherein the operations further comprise:

using biometric data captured from the user to verify the identity of the user.

18. The computer-readable storage device of claim 16, wherein the operations further comprise:

indicating whether an age requirement is met, wherein the response from the digital identity application comprises an indication as to whether the age requirement is met.

19. The computer-readable storage device of claim 16, wherein the operations further comprise:

providing, by the digital identity application, requested age verification without sending any personally identifiable information (PII) to the digital wallet application, such that no PII is transmitted to the point-of-sale terminal.

20. The computer-readable storage device of claim 16, wherein the operations further comprise:

transmitting, by the mobile device, to the point-of-sale terminal, a Card Risk Management Data Object List (CDOL), and wherein one or more objects in the CDOL specifies a format for the age requirement data.

* * * * *